(12) United States Patent
Högasten

(10) Patent No.: US 8,306,275 B2
(45) Date of Patent: Nov. 6, 2012

(54) METHOD FOR SIGNAL CONDITIONING

(75) Inventor: Nicholas Högasten, Hägersten (SE)

(73) Assignee: FLIR Systems AB, Danderyd (SE)

( * ) Notice: Subject to any disclaimer, the term of this patent is extended or adjusted under 35 U.S.C. 154(b) by 733 days.

(21) Appl. No.: 12/298,557

(22) PCT Filed: Apr. 4, 2007

(86) PCT No.: PCT/SE2007/000316
§ 371 (c)(1),
(2), (4) Date: Sep. 4, 2009

(87) PCT Pub. No.: WO2007/123453
PCT Pub. Date: Nov. 1, 2007

(65) Prior Publication Data
US 2010/0034479 A1    Feb. 11, 2010

(30) Foreign Application Priority Data

Apr. 25, 2006    (SE) .................................... 0600892

(51) Int. Cl.
*G06K 9/00*    (2006.01)
(52) U.S. Cl. ...................................................... 382/107

(58) Field of Classification Search .......... 382/100–107; 73/488–490; 348/154–156; 356/27–30; 375/240.03–240.16, E7.123–E7.139
See application file for complete search history.

(56) References Cited

U.S. PATENT DOCUMENTS 5,291,560 A        3/1994  Daugman
2009/0122866 A1 *  5/2009  Crawford et al. ........ 375/240.16

* cited by examiner

*Primary Examiner* — Atiba O Fitzpatrick
(74) *Attorney, Agent, or Firm* — Venable LLP; Eric J. Franklin

(57) ABSTRACT

A method for signal conditioning of signals from a two-dimensional image by calculating the motion of an image in relation to an image plane. Two-dimensional structures in the image are correlated between images separated in time, using Radon transforms for two or more angles in order to reduce the correlation calculations from two-dimensional correlation to correlation of two or more one-dimensional projections. The one-dimensional projections are differentiated to obtain the gradients of the projections as the basis for the correlation of images separated in time and signal conditioning. The magnitude of the gradients of the projections is ignored and the sign value of the gradients is used for a binary representation as the basis for the correlation of images separated in time.

4 Claims, 4 Drawing Sheets

Horizontal projection

Vertical projection

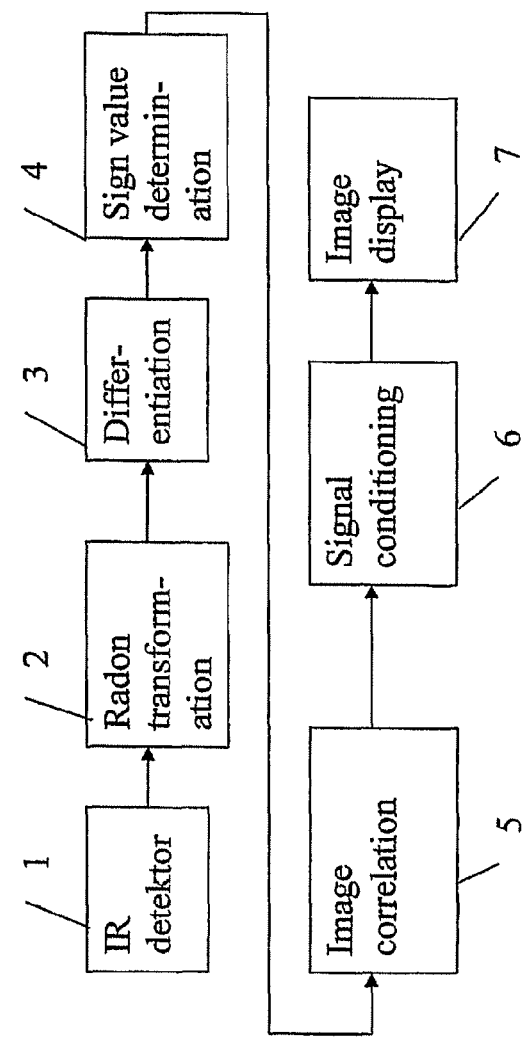

METHOD FOR SIGNAL CONDITIONING

CROSS-REFERENCE TO RELATED APPLICATIONS

This application claims priority to Swedish patent application number 0600892-4 filed 25 Apr. 2006 and is the national phase under 35 U.S.C. §371 of PCT/SE2007/000316 filed 4 Apr. 2007.

The present invention relates to a method for signal conditioning of signals from a two-dimensional image by calculating motion of the image in relation to an image plane, the images that are separated in time being correlated using Radon transforms calculated all over the image for at least two angles to reduce the correlation of a two-dimensional image to correlation of at least two one-dimensional projections, the one-dimensional projections being differentiated in order to obtain the gradients of the projections as the basis for correlation of images separated in time and signal conditioning.

For signal conditioning of two-dimensional signals in general and video signals from IR detectors in particular, it is of value to be able to calculate motion of the image in relation to the image plane. Motion can arise as a result of the camera moving or as a result of something moving in the imaged scene. If the relative motion between images of the same scene taken at different times is known, a number of operations can be carried out in order to improve the image quality. In this way, a visually more attractive image can be obtained for an operator and, in favourable conditions, it is also possible to extract more information from the image than what would have been possible if the motion were not known.

For video applications, it is of particular interest to be able to improve the image in real time, with minimal delay before the image becomes available to an operator. An effective motion estimation algorithm therefore needs to be able to calculate the motion in real time. In order for this to be possible, the algorithm needs to be adapted in order to be able to be implemented in such hardware as is available in a video system. An FPGA (Field Programmable Gate Array) or DSP (Digital Signal Processing) is normally used to carry out the mathematical operations on image data.

The most common motion estimation methods are based on correlation between two-dimensional structures in the image. These methods are usually defined as being of the "block matching" type and consist simply of partial images ("blocks") in an image being identified in another image by calculating the correlation between blocks in the two images. The true position of this partial image is assumed to have been found when the best correlation is achieved. In this way, the motion can be calculated. These methods are simple but relatively calculation-intensive. They are also considered to be generally unsuitable for IR, as, with the use of small blocks, they are relatively sensitive to noise. The methods generally fail for scenes with low contrast in which many blocks lack signal content that can be correlated.

A way of reducing the calculation burden and at the same time making the motion estimation less sensitive to noise is to use the Radon transform. The Radon transform is the line integral through a particular point at a particular angle. If only the angles 0° and 90° are used, the transform reduces a two-dimensional image to two one-dimensional projections. The first projection vector is just the sum of the values calculated column by column and the second projection is the sum of the values calculated row by row. For a two-dimensional image with M×N image points, the problem of correlating M*N values is then replaced by only correlating M+N data. This results in a considerable reduction in the number of operations that need to be carried out. In addition, variations in the form of temporal noise from one image to another do not usually have any effect, as the sum of a column or row contains a large number of image points with mutually independent temporal noise.

The method described above has been known for a long time. A large number of variants of the abovementioned principle are described in scientific publications. Examples of methods utilizing the Radon transform are described, for example, in the publications S. Alliney and C. Morandi, "Digital Image Registration Using Projections", IEEE Transactions, Pattern Analysis, Machine Intelligence, Vol. 8, No. 2, 1986, p. 222-233, MILANFAR P. "Model of the effect of image motion in the Radon transform domain", IEEE Transactions on Image Processing, 1999, Vol. 8, nr. 9, p. 1276-1281, ISSN 1057-7149, CRAWFORD A J et al. "Gradient based dominant motion estimation with integral projections for real time video stabilisation" 2004, Vol. 5, p. 3371-3374, ISBN 0-7803-8554-3 and U.S. Pat. No. 6,259,396 B1.

A problem with projection methods is that local changes in the scene can distort the projection, for example when one or more objects in the image have a motion in relation to the background. This is particularly obvious in IR applications where moving objects, such as persons, cars, aircraft, etc, often have a high temperature and hence give rise to a high detector signal in relation to the background. When the simplest measure of correlation, that is vector distance or the sum of the absolute differences, is used, motion of objects with high signal strength will give a large value in the correlation. There is then a risk that the motion of the object is calculated instead of the motion of the background or of the camera, which makes image-improving temporal filtering more difficult, as the same point in the scene can not be identified in images taken at different times.

An object of the present invention is to achieve a method that is less sensitive to influence from objects with motion relative to the background in situations described in the previous paragraph.

The object of the invention is achieved by a method according to the first paragraph, characterized in that the correlation of images separated in time is carried out independent of the absolute signal strength for the different part of a scene based upon the gradients of the projections. By means of the differentiation of the projections, they are made independent of the absolute signal strength for the different parts of the scene. The two one-dimensional vectors are replaced by two vectors that describe the gradient of the projection. If the detector is assumed to have a linear response, these gradient values will be independent of signal level/offset. Simulations that have been carried out also show that the gradient values are more robust when there are moving objects in the scene.

When the moving objects take up a large part of image area, it is often the case that the objects' internal dynamics are also higher than for the background. The moving objects have thus steeper internal gradients. The problem of these objects having disproportionably large values in the correlation for their size thus remains, although to a smaller extent. A solution to this is to ignore the magnitude of the gradients and to use a binary representation of the gradient. According to an advantageous further development of the method, the magnitude of the gradients of the projections is therefore ignored and the sign value of the gradients is used for a binary representation as a basis for the correlation of images separated in time.

According to yet another advantageous further development of the method, the binary value 1 is allocated when the gradient is positive and the binary value 0 is allocated to a negative gradient and a zero gradient. As a result of this further development, it is the case that:

1 The algorithm is independent of absolute temperature/signal strength or sudden global level differences in signal strength.

2 The algorithm is independent of global changes in response of the detector. This is particularly valuable for non-temperature-stabilized IR systems or systems with considerable global 1/f noise.

3 The algorithm is very robust against relative motion of objects, provided that these do not take up a very large part of the imaged scene. This is in order that each element in the two one-dimensional projections, transformed and converted to binary values, is given equal weight in the correlation, the weight 1. When objects with motion in relation to the background are very large, it is perhaps their motion that is detected as the background is largely obscured.

4 The algorithm is particularly suitable for implementation in hardware as we are now working with binary data in the normally calculation-intensive correlation. The problem is reduced from correlation of M*N 16-bit numbers to correlation of M+N numbers of 1 bit each. This corresponds to a reduction in the quantity of data by a factor of >4000 times. In order to calculate the motion between two images, all possible motion in the horizontal and vertical direction must be considered and hence the correlation calculations need to be repeated a large number of times. The total number of operations that needs to be carried out in order to calculate the motion is therefore very large and the reduction that can be achieved by reducing the quantity of data is therefore of great importance.

By the introduction of differentiation and conversion to binary values of one-dimensional projections obtained by Radon transforms, the original advantage is retained, namely that the method can cope with a lot of noise when working with very large sets of data where the effects of harmless normally-distributed noise in principle cancel each other out.

The signal conditioning according to the method is advantageously carried out on video signals from JR detectors. In addition, the method is carried out in real time.

The invention will be described below in greater detail with reference to the attached drawings, in which:

FIG. 4 shows, in the form of a table, an example of data converted to binary values from two images with motion between them, and their correlation.

FIG. 5 illustrates schematically, in the form of a block diagram, the process steps that can be included in a method for signal conditioning according to the principles of the invention.

Figure 1:
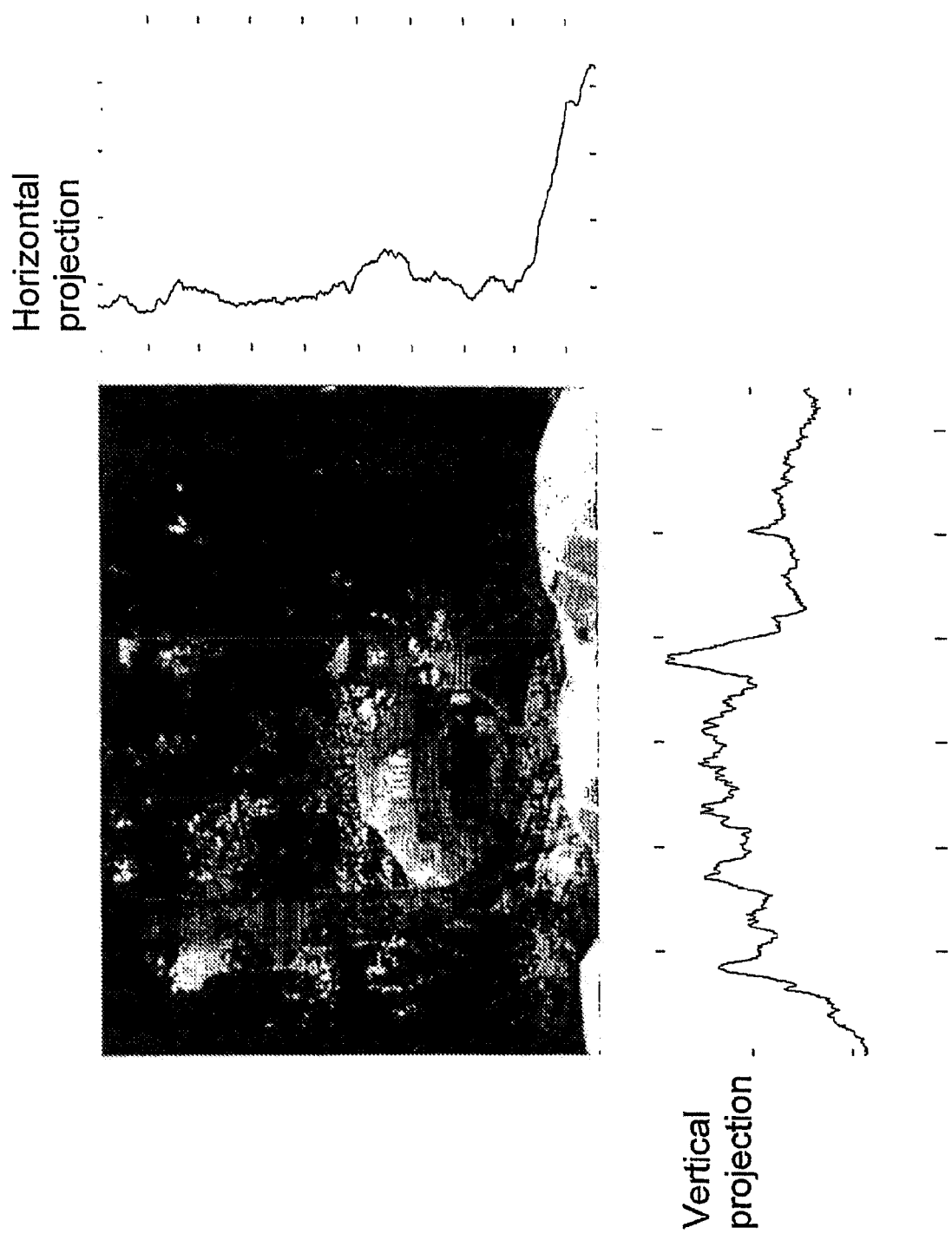
FIG. 1 shows an example of an image and horizontal and vertical projections associated with the image.

FIG. 1 shows a two-dimensional image. The vertical projection of the image is shown below the image. The vertical projection is obtained by a Radon transform for the angle 90°, creating a projection vector that is the sum of the values from the image calculated column by column. A horizontal projection of the image is shown to the right of the image. The horizontal projection is obtained by a Radon transform for the angle 0°, creating a projection vector that is the sum of values from the image calculated row by row.

Figure 2:
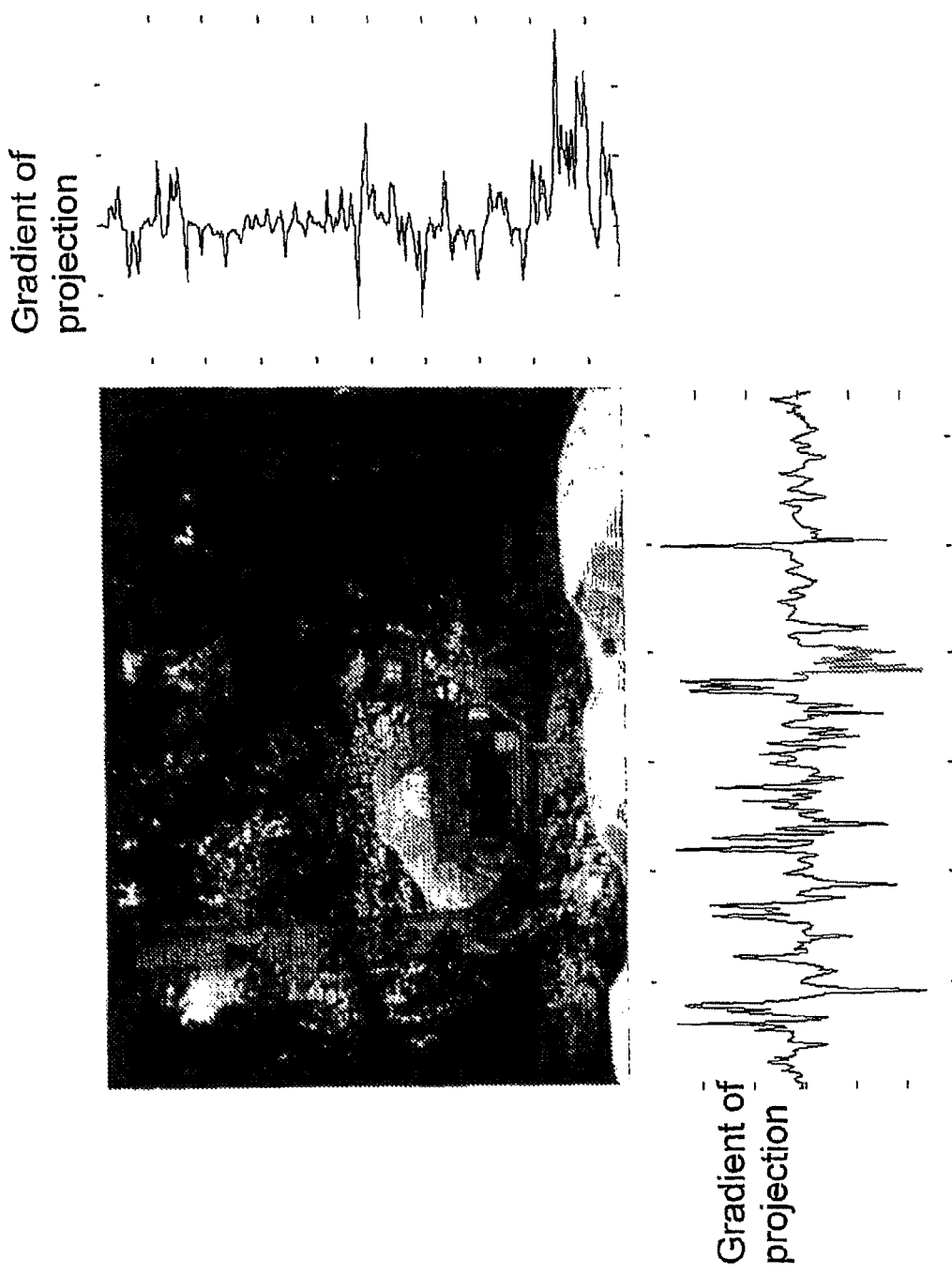
FIG. 2 shows the gradients for the horizontal and vertical projections according to FIG. 1.

According to our preferred method, two projection vectors, of the type that is shown in FIG. 1 and obtained by Radon transform in at least two directions (for example 0 and 90 degrees), are differentiated. The gradients of the projections after differentiation are shown in FIG. 2.

Figure 3:
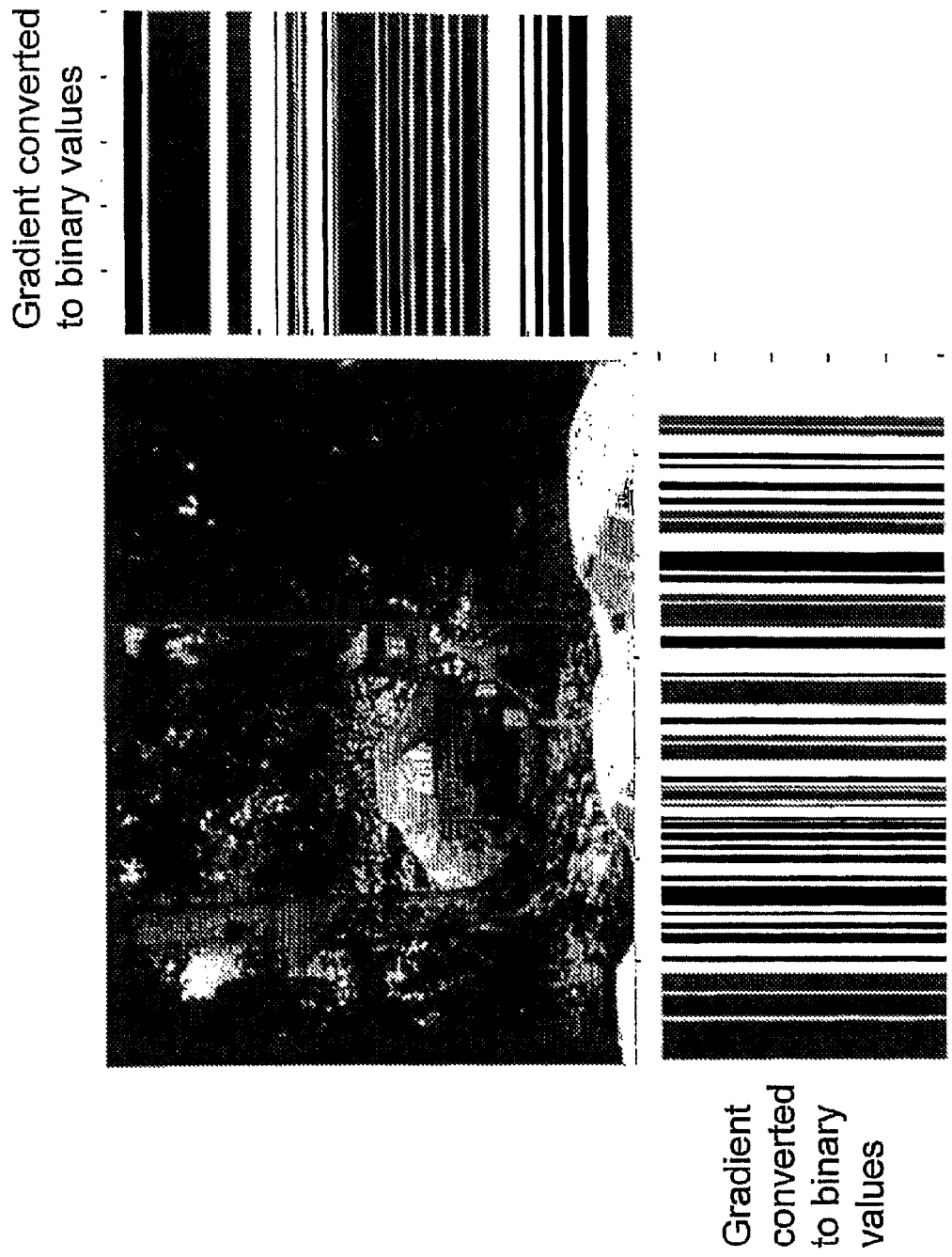
FIG. 3 shows the gradients according to FIG. 2 converted to binary values with only the values 0 or 1.

After differentiation, the projection vectors are converted to binary values in such a way that the gradient at a point n in the horizontal projection and the gradient at a point m in the vertical projection are allocated the binary value 1 if the gradient is positive and the binary value 0 if the gradient is negative or zero. The result of converting the differentiated projection vectors to binary values is shown in FIG. 3.

The table in FIG. 4 (row 1) shows examples of how a horizontal (or vertical) projection in an image is allocated the binary values 1 or 0 and (row 2 in the table) corresponding values from the same projection from an image taken at a different time. An exclusive NOT OR operator (XNOR) is used as an effective correlation operator.

FIG. 5 illustrates schematically, in the form of a block diagram, process steps that can be included in the method for signal conditioning. In this case, there is an IR detector 1 for image recording. In block 2, the image provided by the IR detector in two-dimensional form undergoes a Radon transform in two or possibly more directions and, for example, a vertical and a horizontal projection can be obtained. In block 3, the projections undergo differentiation. After differentiation, in an additional step illustrated by block 4, the sign values of the derivatives can be determined and used as the basis for a conversion to binary values, in which a positive sign value can correspond to the binary value 1 and a negative value or zero value can correspond to the binary value 0. Using as a basis the sign values that were obtained, images separated in time can be correlated, which is illustrated in block 5. In block 6, the image-correlating information is then used for signal conditioning of the image in question, and the image is then displayed, block 7, for example on a display.

The invention is not limited to the embodiments described above as examples, but can be modified within the framework of the following claims.

The invention claimed is:

1. A method for signal conditioning of signals from a two-dimensional image, the method comprising:
    calculating the motion of the image in relation to an image plane,
    correlating the images that are separated in time Radon transforms calculated all over the image for at least two angles in order to reduce a two-dimensional correlation problem to correlation of at least two one-dimensional projections, and
    differentiating the one-dimensional projections in order to obtain the gradients of the projections as the basis for the correlation of images separated in time and signal conditioning,
    wherein the correlation of images separated in time is carried out independent of the absolute signal strength for the different part of a scene based upon the gradients of the projections, and wherein the magnitude of the gradients of the projections is ignored and wherein the sign values of the gradients are used for a binary representation as the basis for the correlation of images separated in time.

2. A method for signal conditioning of signals from a two-dimensional image, the method comprising:
    calculating the motion of the image in relation to an image plane,
    correlating the images that are separated in time Radon transforms calculated all over the image for at least two angles in order to reduce a two-dimensional correlation problem to correlation of at least two one-dimensional projections, and differentiating the one-dimensional projections in order to obtain the gradients of the projections as the basis for the correlation of images separated in time and signal conditioning, wherein the correlation of images separated in time is carried out independent of the absolute signal strength for the different part of a scene based upon the gradients of the projections, and wherein the binary value 1 is allocated to a positive gradient and the binary value 0 is allocated to a negative gradient and a zero gradient.

3. The method according to claim 1, wherein video signals from IR detectors are signal conditioned.

4. The method according to claim 1, wherein the signal conditioning is carried out in real time.

* * * * *